(12) United States Patent
Chuang et al.

(10) Patent No.: US 8,274,489 B2
(45) Date of Patent: Sep. 25, 2012

(54) READOUT APPARATUS AND MULTI-CHANNEL READOUT APPARATUS FOR TOUCH PANEL

(75) Inventors: Kai-Lan Chuang, Tainan County (TW); Guo-Ming Lee, Tainan County (TW); Ying-Lieh Chen, Tainan County (TW)

(73) Assignee: Himax Technologies Limited, Tainan (TW)

( * ) Notice: Subject to any disclaimer, the term of this patent is extended or adjusted under 35 U.S.C. 154(b) by 576 days.

(21) Appl. No.: 12/561,868

(22) Filed: Sep. 17, 2009

(65) Prior Publication Data
US 2011/0063233 A1    Mar. 17, 2011

(51) Int. Cl.
*G06F 3/041* (2006.01)
(52) U.S. Cl. ......... 345/173; 345/174; 345/175; 345/178
(58) Field of Classification Search .................. 345/173, 345/174, 175, 178, 88; 307/109; 324/658, 324/120; 455/411
See application file for complete search history.

(56) References Cited

U.S. PATENT DOCUMENTS

| | | | | |
|---|---|---|---|---|
| 5,204,661 | A * | 4/1993 | Hack et al. ...................... | 345/88 |
| 5,880,538 | A * | 3/1999 | Schulz .......................... | 307/109 |
| 6,362,632 | B1 * | 3/2002 | Livingston .................... | 324/661 |
| 7,782,068 | B2 * | 8/2010 | Kuang .......................... | 324/658 |
| 2002/0052192 | A1 * | 5/2002 | Yamazaki et al. ............. | 455/411 |
| 2009/0115735 | A1 * | 5/2009 | Chuang ......................... | 345/173 |
| 2010/0097345 | A1 * | 4/2010 | Jang et al. ..................... | 345/174 |
| 2010/0097355 | A1 * | 4/2010 | Jang et al. ..................... | 345/178 |
| 2010/0328252 | A1 * | 12/2010 | Chang et al. .................. | 345/174 |
| 2011/0037457 | A1 * | 2/2011 | Chuang et al. ................ | 324/120 |

* cited by examiner

*Primary Examiner* — Thuy Pardo
(74) *Attorney, Agent, or Firm* — J.C. Patents (57) ABSTRACT

A readout apparatus and a multi-channel readout apparatus for a touch panel are provided to integrate different types of readout circuit. The readout apparatus set to a first mode reads the touch panel with a small amount of charges through an integrator. The readout apparatus set to a second mode reads a sensing current of a current type touch panel through a current to voltage converting unit and an inverting amplifier, so as to save a chip area. The multi-channel readout apparatus set to a third mode applies multiple channels to alternatively share an integrator to read the touch panel with a large amount of charges, so that an amount of feedback capacitors (integral capacitors) having a great area can be greatly reduced. Therefore, readout apparatus of the present invention can not only reduce a chip area, but can also be applied to various types of the touch panel.

25 Claims, 10 Drawing Sheets

READOUT APPARATUS AND MULTI-CHANNEL READOUT APPARATUS FOR TOUCH PANEL

BACKGROUND OF THE INVENTION

1. Field of the Invention

The present invention relates to a touch apparatus. More particularly, the present invention relates to a readout apparatus for a touch panel.

2. Description of Related Art

With booming development of electronic technologies, and popularization of wireless communication and networks, various electronic devices gradually become indispensable tools for people's daily life. However, operation of a commonly used input/output (I/O) interface such as a keyboard or a mouse is rather difficult. Comparatively, a touch panel is an intuitive and simple I/O interface. Therefore, the touch panel is generally used as a human-machine interface between a user and an electronic device to facilitate control operations.

Figure 1:
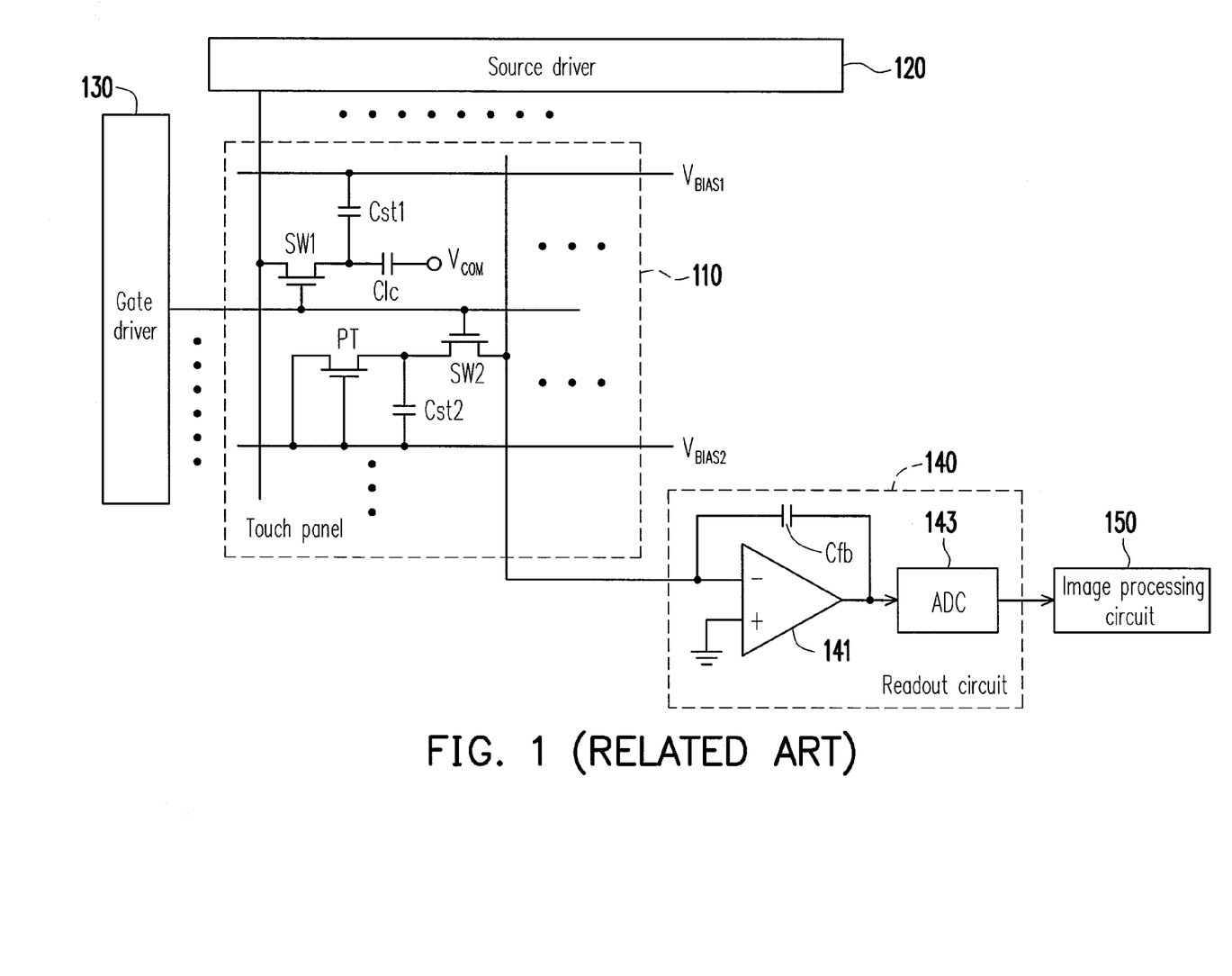
FIG. 1 is a schematic diagram illustrating a photo charge type touch panel and a conventional readout circuit.

Generally, the touch panels are grouped into resistive touch panels, photo touch panels and capacitive touch panels, etc. Considering a readout approach, the touch panels are grouped into current type touch panels and charge type touch panels, etc. FIG. 1 is a schematic diagram illustrating a photo charge type touch panel and a conventional readout circuit. A plurality of data lines and a plurality of scan lines of the photo charge type touch panel 110 are respectively driven by a source driver 120 and a gate driver 130, and a plurality of sensor lines of the photo charge type touch panel 110 is coupled to a plurality of readout circuits 140. Only one of the scan lines, one of the data lines and one of the sensor lines are illustrated in FIG. 1.

A storage capacitor Cst1 and a liquid crystal capacitor Clc are respectively coupled to a bias voltage $V_{BIAS1}$ and a common voltage $V_{COM}$. The bias voltage $V_{BIAS1}$ and a common voltage $V_{COM}$ can be same or difference voltage(s). When the gate driver 130 turns on a switch SW1 through the scan line, the source driver 120 writes pixel data into the storage capacitor Cst1 and the liquid crystal capacitor Clc through the data line. Since a voltage difference between the pixel data and the common voltage $V_{COM}$ correspondingly deflects liquid crystal molecules in the liquid crystal capacitor Clc, the pixel may have a corresponding gray level.

Based on a bias voltage $V_{BIAS2}$, a photo transistor PT provides a discharge path between a storage capacitor Cst2 and the bias voltage $V_{BIAS2}$. If a position where the photo transistor PT is located is not touched by the user, the photo transistor PT accelerates discharging the storage capacitor Cst2 due to irradiation of an external light. Conversely, if the external light irradiating on the photo transistor PT is reduced due to a user's touch, the photo transistor PT slows down discharging the storage capacitor Cst2. When the gate driver 130 turns on a switch SW2 through one of the scan lines, the readout circuit 140 reads the remained charge quantity of the storage capacitor Cst2 through one of the sensor lines, and simultaneously charges the storage capacitor Cst2 to a normal rated voltage level.

When the readout circuit 140 detects the photo charge type touch panel 110, a position touched by the user is mainly determined according to inconsistent discharge of the storage capacitor Cst2 or whether there is a coupling capacitor. Regarding the photo charge type touch panel 110, an integrator (i.e. an operation amplifier 141 and a feedback capacitor Cfb) is generally configured in the readout circuit 140 to detect a charge difference of the photo charge type touch panel 110. An analog-to-digital converter (ADC) 143 converts an integration result of the integrator into a corresponding digital code, and transmits the digital code to an image processing circuit 150 for determining the touch position.

Figure 2:
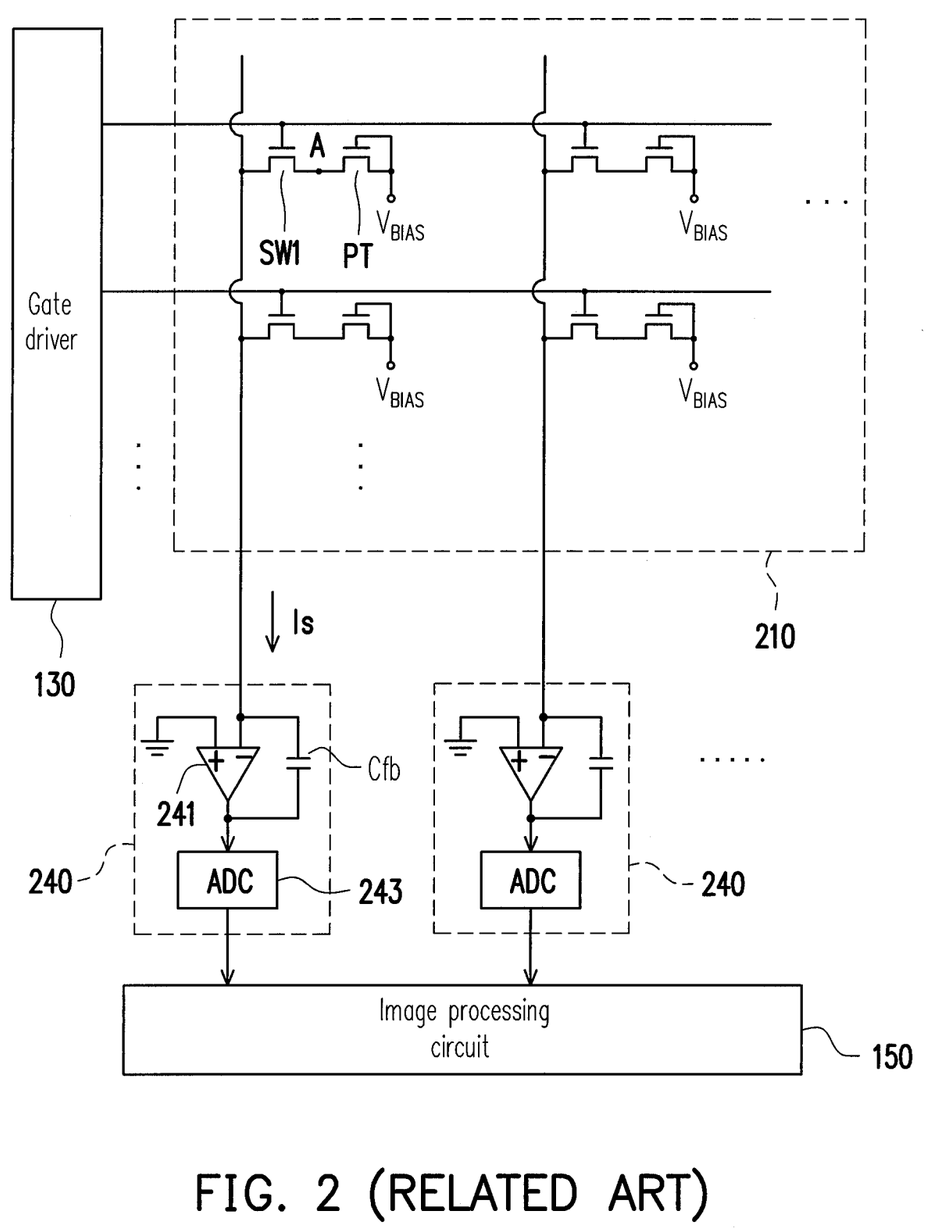
FIG. 2 is a schematic diagram illustrating a photo current type touch panel and a conventional readout circuit.

FIG. 2 is a schematic diagram illustrating a photo current type touch panel and a conventional readout circuit. A plurality of scan lines of the touch panel 210 is driven by the gate driver 130, and a plurality of sensor lines of the touch panel 210 is coupled to a readout circuit 240. A pixel layout of the conventional photo current type touch panel 210 is as that shown in FIG. 2. Each of the pixels has a switch SW1 and a photo transistor PT. When the bias voltage $V_{BIAS}$ is higher than a voltage of a node A and the gate driver 130 turns on the switch SW1 through the scan line, a sensing current Is will flow to the sensor line through the photo transistor PT and the switch SW1, due to the fact that the photo transistor PT is in a forward-bias state. Wherein, an intensity of the light irradiating on the photo transistor PT can influence an amount of the sensing current Is.

The readout circuit 240 is used to detect the amount and a difference of the sensing current Is on each of the sensor lines, so as to determine whether a light-shielding object is located at a corresponding position of the touch panel 210 (i.e. whether an external object touches the touch panel 210). The readout circuit 240 transmits a detection result in form of the digital code to the image processing circuit 150. The image processing circuit 150 then determines the touch position according to all of the digital codes provided by the readout circuit 240. The conventional readout circuit 240 uses an integrator (i.e. an operation amplifier 241 and a feedback capacitor Cfb) to convert the sensing current Is into a corresponding voltage, and then an ADC 243 converts the voltage into a corresponding digital code, and transmits the digital code to the image processing circuit 150 for determining the touch position.

Figure 3:
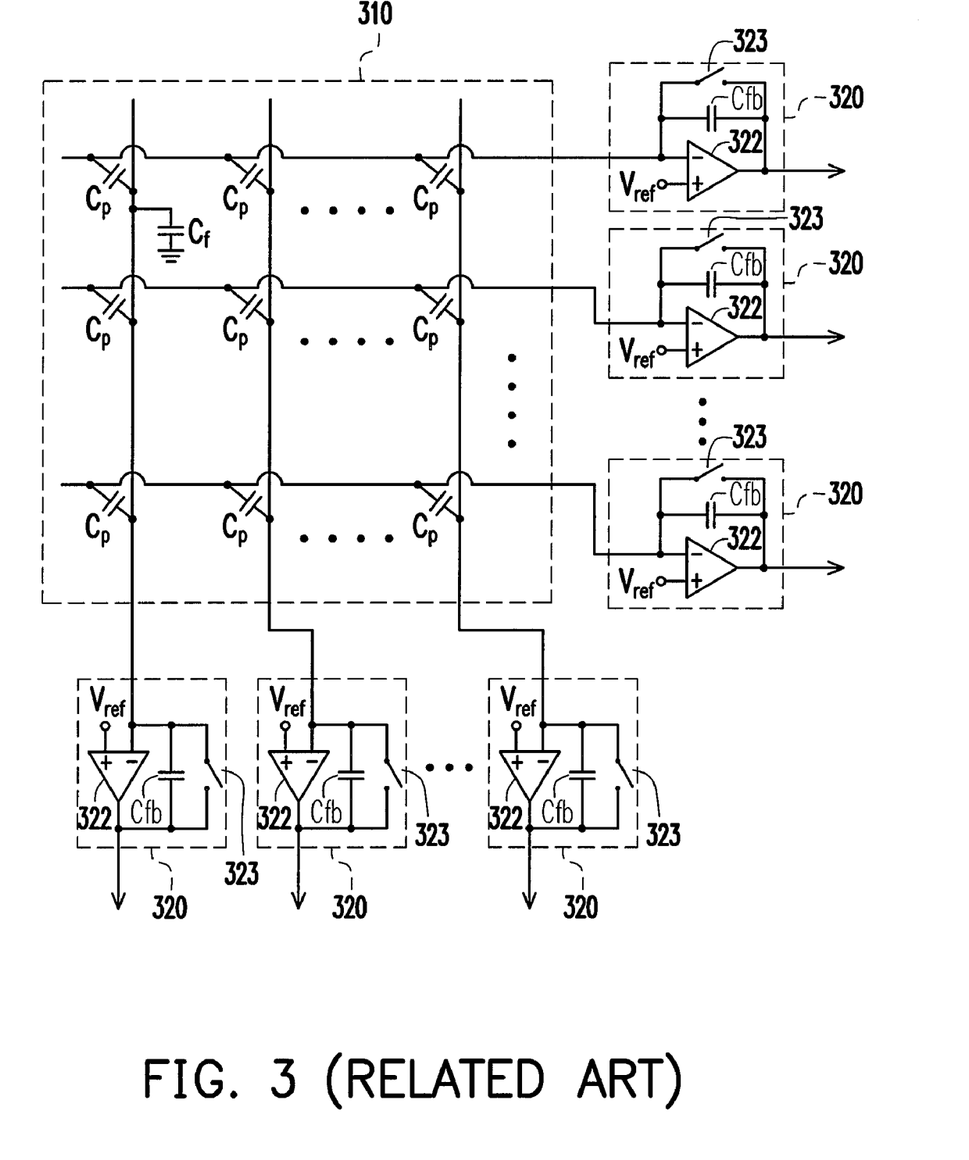
FIG. 3 is a schematic diagram illustrating a capacitive touch panel and a conventional readout circuit.

FIG. 3 is a schematic diagram illustrating a capacitive touch panel and a conventional readout circuit. The capacitive touch panel 310 has a plurality of sensor lines in a Y-axis direction and a plurality of sensor lines in an X-axis direction. A coupling capacitor Cp is formed between each of the Y-axis direction sensor lines and each of the X-axis direction sensor lines. An integrator 320 including an operation amplifier 322 and a feedback capacitor Cfb is configured to each of the sensor lines. In the beginning, positive input terminals of all of the operation amplifiers 322 receive a 0V (volt) reference voltage Vref, and all of switches 323 are turned on, so that all of the sensor lines are charged to 0V. Thereafter, the integrators 320 turn off the switches 323 to perform readout operations. During a period when the switches 323 are turned off, assuming no conductor (for example, a finger) touches the touch panel 310, when the reference voltage Vref is transited from 0V to 5V, the integrators 320 in the Y-axis direction and the X-axis direction can equalize the voltages at two ends of the coupling capacitor Cp to 5V. Since charge/discharge of the coupling capacitors Cp is not required, when the reference voltage Vref is transited to 5V, such variation is reflected on an output of the integrator 320. After the integrators 320 complete the readout operations, all of the switches 323 are again turned on, and the above operations are repeated.

When the conductor (for example, the finger) touches the touch panel 310, an extra capacitor Cf is formed at the corresponding touch position as that shown in FIG. 3. During a period when the switches 323 are turned off, when the reference voltage Vref is transferred from 0V to 5V, the corresponding integrator 320 charges/discharges the extra capacitor Cf through the sensing line. Therefore, when the reference voltage Vref is transferred to 5V, an output OUT of the integrator 320 corresponding to the extra capacitor Cf is varied, and a formula thereof is OUT=5+[(5V−0V)×Cf]/Cfb. Then, the integrator 320 transmits the readout result to a follow-up circuit (including the ADC and the image processing circuit that are not illustrated) for determining coordinates of the touch position. According to a difference between a signal read by the sensor line having the extra capacitor Cf and a signal read by the sensor line without the extra capacitor Cf, the touch position can be determined. According to the above formula, it is known that the larger the extra capacitor Cf is, the larger the feedback capacitor Cfb is, otherwise, the output of the integrator 320 is easy to be saturated, and the touch position cannot be determined.

However, to avoid the saturation of the output of the integrator, capacitances of the feedback capacitors Cfb in the integrators has to be increased (i.e. the areas of the capacitors have to be increased). Since each of the sensor lines requires an integrator, a chip area occupied by the integrators is considerable. Moreover, different types of the touch panel require the readout circuits of different functions to read the signals of the touch panels and convert the signals into the digital signals that can be operated by the follow-up image processing circuits. For example, a capacitance of the feedback capacitor Cfb of FIG. 3 is much bigger than a capacitance of the feedback capacitor Cfb, so that the readout circuit 140 applied to the photo charge type touch panel 110 cannot be applied to the capacitive touch panel 310. If each type of the touch panel applies the readout circuit of a different function, a usage flexibility of the readout apparatus of the touch panel is relatively low.

SUMMARY OF THE INVENTION

The present invention is directed to a readout apparatus and a multi-channel readout apparatus for a touch panel, which can be applied to different types of the touch panel.

The present invention provides a readout apparatus for a touch panel, which includes a first selector, a second selector, a third selector, a fourth selector, a current to voltage converting unit, a first resistor, a second resistor, a first operation amplifier, a feedback capacitor and a feedback switch. A common terminal of each of the selectors is electrically connected to a first selection terminal or a second selection terminal, selectively. An input terminal of the current to voltage converting unit is coupled to the first selection terminal of the first selector. A first terminal of the first resistor is coupled to an output terminal of the current to voltage converting unit. The first selection terminal of the second selector is coupled to a second terminal of the first resistor, and the second selection terminal of the second selector is coupled to the second selection terminal of the first selector. A first input terminal of the first operation amplifier is coupled to the common terminal of the second selector, and a second input terminal of the first operation amplifier receives a reference voltage. The common terminal of the third selector is coupled to the first input terminal of the first operation amplifier. The common terminal of the fourth selector is coupled to an output terminal of the first operation amplifier. A first terminal of the second resistor is coupled to the first selection terminal of the third selector, and a second terminal of the second resistor is coupled to the first selection terminal of the fourth selector. A first terminal of the feedback capacitor is coupled to the second selection terminal of the third selector, and a second terminal of the feedback capacitor is coupled to the second selection terminal of the fourth selector. A first terminal and a second terminal of the feedback switch are respectively coupled to the first terminal and the second terminal of the feedback capacitor.

The present invention provides a multi-channel readout apparatus for a touch panel. The multi-channel readout apparatus includes an integrator and a plurality of channels. Each channel includes an input selector, a first selector, a second selector, a third selector, a fourth selector, a current to voltage converting unit, a first resistor, a second resistor, a first operation amplifier, a feedback capacitor, a feedback switch and an output selector. A common terminal of each of the selectors is electrically connected to a first selection terminal or a second selection terminal, selectively. The first selection terminal of the input selector is coupled to an input terminal of the integrator. The common terminal of the first selector is coupled to the second selection terminal of the input selector. An input terminal of the current to voltage converting unit is coupled to the first selection terminal of the first selector. A first terminal of the first resistor is coupled to an output terminal of the current to voltage converting unit. The first selection terminal of the second selector is coupled to a second terminal of the first resistor, and the second selection terminal of the second selector is coupled to the second selection terminal of the first selector. A first input terminal of the first operation amplifier is coupled to the common terminal of the second selector, and a second input terminal of the first operation amplifier receives a reference voltage. The common terminal of the third selector is coupled to the first input terminal of the first operation amplifier. The common terminal of the fourth selector is coupled to an output terminal of the first operation amplifier. A first terminal of the second resistor is coupled to the first selection terminal of the third selector, and a second terminal of the second resistor is coupled to the first selection terminal of the fourth selector. A first terminal of the feedback capacitor is coupled to the second selection terminal of the third selector, and a second terminal of the feedback capacitor is coupled to the second selection terminal of the fourth selector. A first terminal and a second terminal of the feedback switch are respectively coupled to the first terminal and the second terminal of the feedback capacitor. The first selection terminal of the output selector is coupled to an output terminal of the integrator, and the second selection terminal of the output selector is coupled to the output terminal of the first operation amplifier.

In an embodiment of the present invention, in a first mode, the input selector, the first selector, the second selector, the third selector, the fourth selector and the output selector respectively select to electrically connect the common terminal thereof to the second selection terminal thereof.

In an embodiment of the present invention, in a second mode, the input selector, the first selector, the second selector, the third selector, the fourth selector and the output selector respectively select to electrically connect the common terminal thereof to the first selection terminal thereof.

In an embodiment of the present invention, in a third mode, the first selector, the second selector, the third selector and the fourth selector respectively select to electrically connect the common terminal thereof to the second selection terminal thereof, and the feedback switch is turned on. In the third mode, the input selector and the output selector of one of the channels respectively select to electrically connect the common terminal thereof to the first selection terminal thereof, and the input selectors and the output selectors of the other channels respectively select to electrically connect the common terminal thereof to the second selection terminal thereof.

In the present invention, the readout circuits of different types are integrated. The current to voltage converting unit and an inverting amplifier are used to read the sensing current of the current type touch panel, so that utilization of integral capacitors is avoided and a chip area occupied by the feedback capacitors is reduced. In some embodiments, multiple channels can alternately share a common integrator to read the sensing charges of the capacitive touch panel, so that an area of the feedback capacitor (integral capacitor) can be greatly reduced. Therefore, readout apparatus of the present invention can not only reduce a chip area, but can also be applied to various types of the touch panel.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following embodiments, a photo charge type touch panel and a photo current type touch panel are taken as an example for describing applications of readout apparatus of the present invention. However, application of the present invention is not limited thereto.

Figure 4:
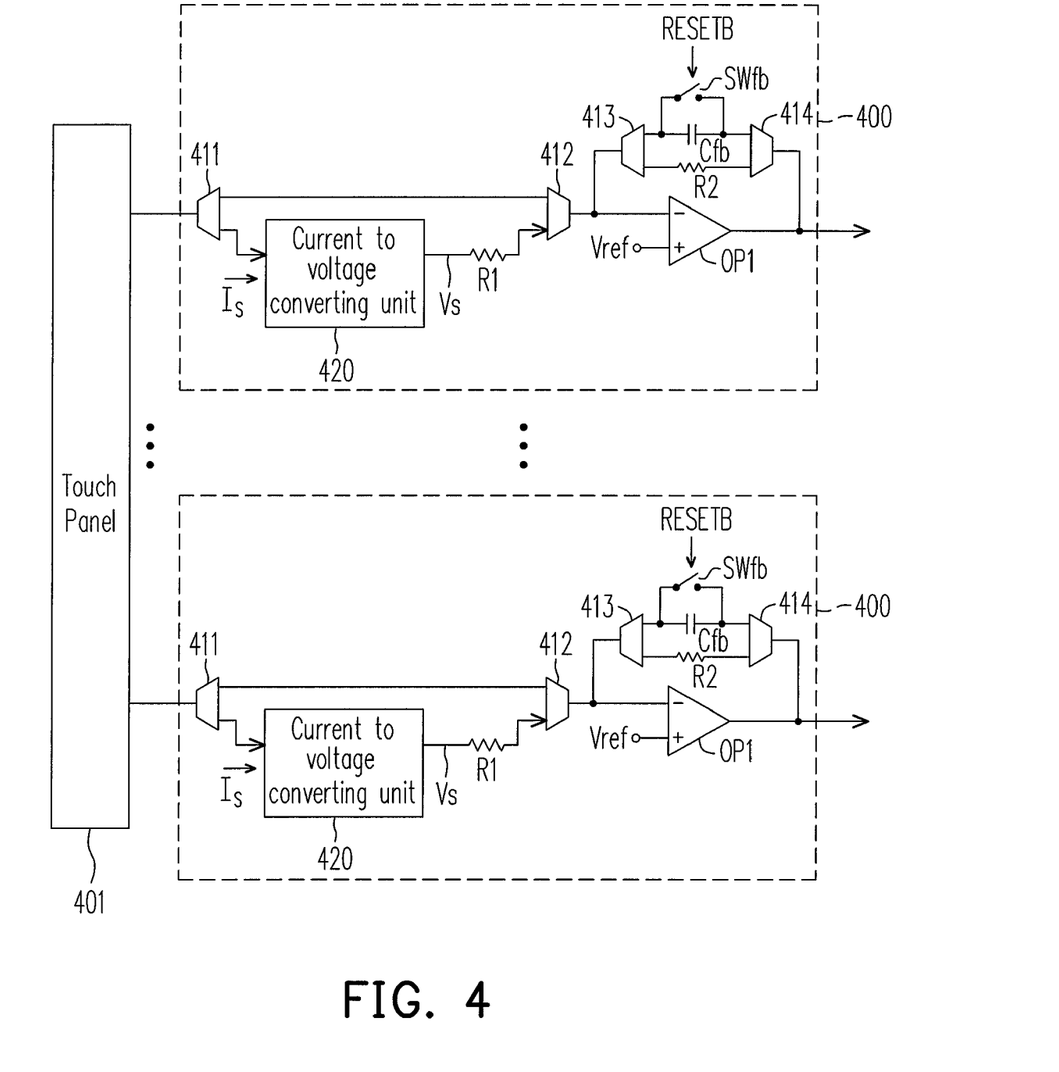
FIG. 4 is a circuit schematic diagram illustrating a readout apparatus of a touch panel according to an embodiment of the present invention.

FIG. 4 is a circuit schematic diagram illustrating a readout apparatus 400 of a touch panel according to an embodiment of the present invention. An input terminal of the readout apparatus 400 is coupled to sensor lines of the touch panel 401, and an output terminal of the readout apparatus 400 transmits a readout result to a follow-up circuit (including an analog-to-digital converter (ADC) and an image processing circuit, which are not illustrated) for determining coordinates of a touch position. The touch panel 401 can be a charge type touch panel (for example, the photo charge type touch panel 110 shown in FIG. 1), or a current type touch panel (for example, the photo current type touch panel 210 shown in FIG. 2).

The readout apparatus 400 includes a first selector 411, a second selector 412, a third selector 413, a fourth selector 414, a current to voltage converting unit 420, a first resistor R1, a second resistor R2, a first operation amplifier OP1, a feedback capacitor Cfb and a feedback switch SWfb. A common terminal of each of the selectors 411-414 is electrically connected to a first selection terminal or a second selection terminal, selectively. For example, the selector 411 can electrically connect the common terminal thereof to the first selection terminal thereof, or electrically connect the common terminal to the second selection terminal thereof. In the present embodiment, the selectors 411 and 413 are demultiplexers, and the selectors 412 and 414 are multiplexers.

The common terminal of the selector 411 is coupled to the corresponding sensor line of the touch panel 401. An input terminal of the current to voltage converting unit 420 is coupled to the first selection terminal of the selector 411. A first terminal of the resistor R1 is coupled to an output terminal of the current to voltage converting unit 420 and a second terminal of the resistor R1 is coupled to the first selection terminal of the selector 412. The second selection terminal of the selector 412 is coupled to the second selection terminal of the selector 411. A first input terminal of the operation amplifier OP1 is coupled to the common terminal of the selector 412, and a second input terminal of the operation amplifier OP1 receives a first reference voltage Vref. In the present embodiment, the first input terminal of the operation amplifier OP1 is an inverting input terminal, and the second input terminal of the operation amplifier OP1 is a non-inverting input terminal, and an output terminal of the operation amplifier OP1 transmits a readout result to a follow-up circuit (not illustrated) for determining coordinates of a touch position.

Figure 11:
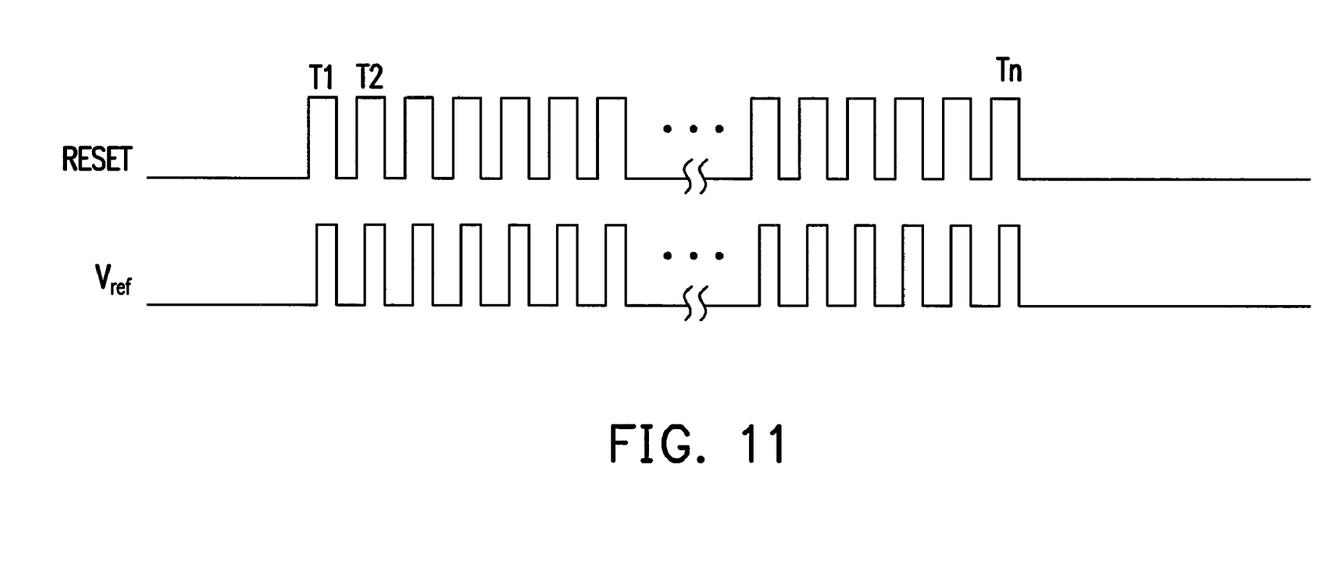
FIG. 11 is a diagram showing wave form of reset signal and reference voltage in the embodiments of the present invention.

A voltage level of the reference voltage Vref can be determined according to a design requirement of a user and the type of the touch panel 401. For example, the reference voltage Vref is set to be a half of a system voltage VDDA (i.e. VDDA/2), or is set to be a band-gap voltage, or is set to be +5V or other fixed voltages. In some embodiments, the reference voltage Vref can be set to be a time-varying voltage corresponding to a reset signal RESET. FIG. 11 is a diagram showing wave form of the reset signal RESET and the reference voltage Vref in the embodiment. When the reset signal RESET has a logic low level, the reference voltage Vref is a ground voltage (i.e. 0V), and after the reset signal RESET is transferred to a logic high level, the reference voltage Vref is transferred to half level of the system voltage VDDA (i.e. VDDA/2, for example, +5V) in response to the reset signal RESET.

The common terminal of the selector 413 is coupled to the first input terminal of the operation amplifier OP1. The common terminal of the selector 414 is coupled to the output terminal of the operation amplifier OP1. A first terminal of the resistor R2 is coupled to the first selection terminal of the selector 413, and a second terminal of the resistor R2 is coupled to the first selection terminal of the selector 414. A first terminal of the feedback capacitor Cfb is coupled to the second selection terminal of the selector 413, and a second terminal of the feedback capacitor Cfb is coupled to the second selection terminal of the selector 414. A first terminal and a second terminal of the feedback switch SWfb are respectively coupled to the first terminal and the second terminal of the feedback capacitor Cfb. The feedback switch SWfb is controlled by a signal RESETB inverted from the reset signal RESET.

In a first mode, the selectors 411-414 respectively select to electrically connect the common terminal thereof to the second selection terminal thereof. In the first mode, when the feedback switch SWfb is turned off, the operation amplifier OP1 and the feedback capacitor Cfb form an integrator. The readout apparatus 400 set to the first mode can read the sensing signals of the photo charge type touch panel 110.

Figure 5:
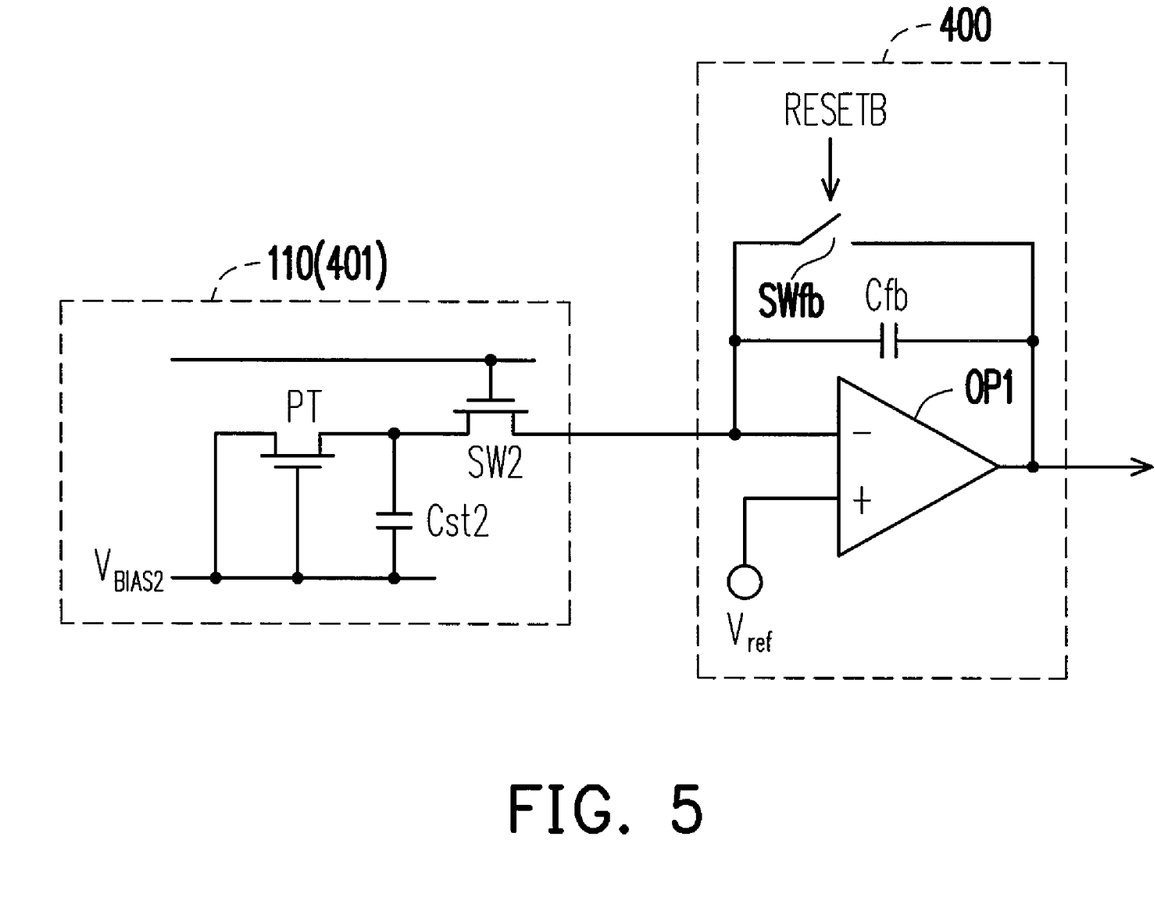
FIG. 5 is an equivalent circuit diagram of a readout apparatus of FIG. 4 that is set to a first mode according to an embodiment of the present invention.

FIG. 5 is an equivalent circuit diagram of the readout apparatus 400 of FIG. 4 that is set to the first mode according to an embodiment of the present invention. The touch panel 401 is assumed to be the photo charge type touch panel 110 shown in FIG. 1. During a period when the system is initially powered on, or during a reset period of the system, the system sets the reset signal RESET to an enabling state (which may have a logic low level). When the reset signal RESET has the logic low level (i.e. the signal RESETB is set to the logic high level), the feedback switch SWfb is turned on to reset the feedback capacitor Cfb. When the reset signal RESET is in a disabling state (for example, has a logic high level, i.e. the signal RESETB is set to the logic low level), and the switch SW2 is turned on, the integrator can perform an integration operation to the sensor line of the touch panel 110 (i.e. the touch panel 401), and then the operation amplifier OP1 transmits the readout result to the follow-up circuit (not illustrated) for determining the coordinates of the touch position.

Referring to FIG. 4, in a second mode, the selectors 411-414 respectively select to electrically connect the common terminal thereof to the first selection terminal thereof. In the second mode, the readout apparatus 400 can be regarded as a readout circuit formed by the current to voltage converting unit 420 and an inverting amplifier 610. The readout apparatus 400 set to the second mode can read the sensing signals of the photo current type touch panel 210.

Figure 6:
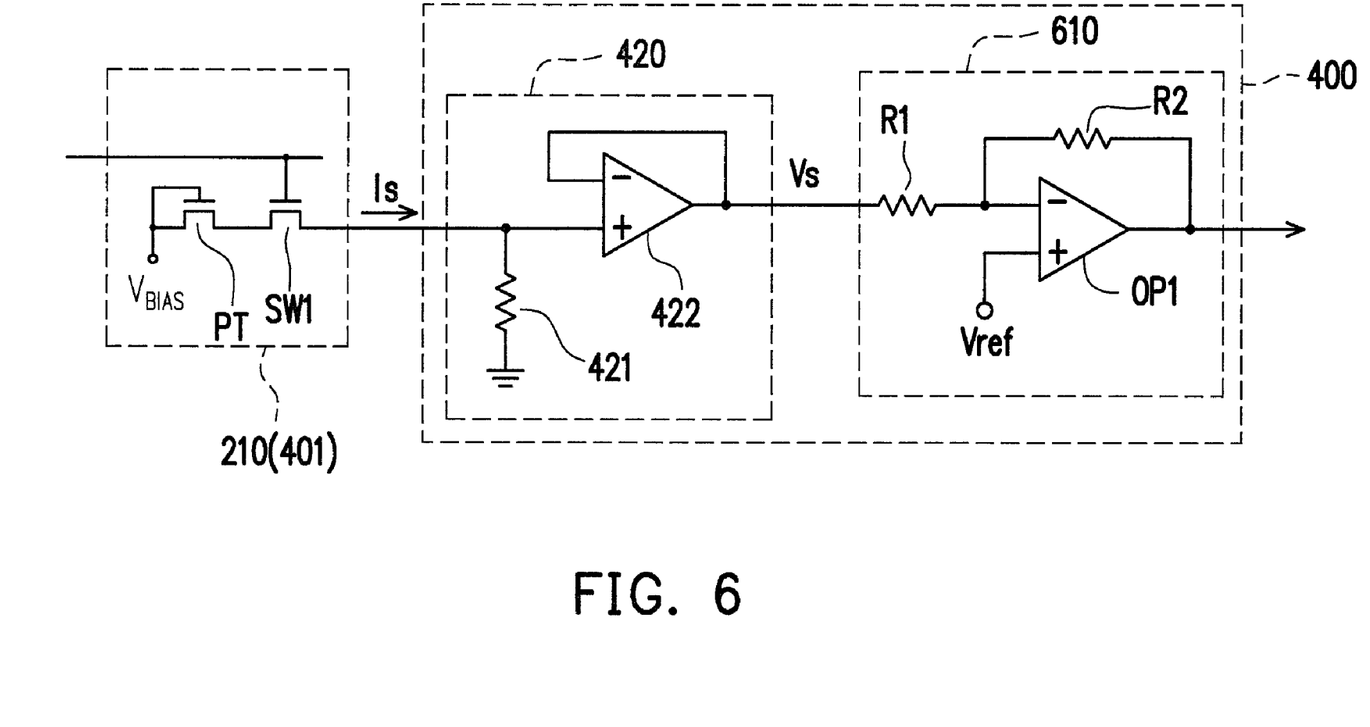
FIG. 6 is an equivalent circuit diagram of a readout apparatus of FIG. 4 that is set to a second mode according to an embodiment of the present invention.

FIG. 6 is an equivalent circuit diagram of the readout apparatus 400 of FIG. 4 that is set to the second mode according to an embodiment of the present invention. The touch panel 401 is assumed to be the photo current type touch panel 210 shown in FIG. 2. The current to voltage converting unit 420 converts a sensing current Is of the current type touch panel 210 into a sensing voltage Vs. An input terminal of the inverting amplifier 610 formed by the resistors R1, R2 and the operation amplifier OP1 is coupled to the output terminal of the current to voltage converting unit 420 for receiving the sensing voltage Vs. After the inverting amplifier 610 gains the sensing voltage Vs, the readout result is transmitted to the follow-up circuit (not illustrated) for determining the coordinates of the touch position.

In the present embodiment, the current to voltage converting unit 410 includes a third resistor 421 and a unit-gain amplifier, wherein the unit-gain amplifier is implemented by an operation amplifier 422. A first terminal of the resistor 421 serves as the input terminal of the current to voltage converting unit 420, and a second terminal of the resistor 421 is coupled to a second reference voltage (for example, the ground voltage). A first terminal of the operation amplifier 422 (i.e. an input terminal of the unit-gain amplifier) is coupled to the first terminal of the resistor 421, a second terminal of the operation amplifier 422 is coupled to an output terminal of the operation amplifier 422 (i.e. an output terminal of the unit-gain amplifier), and the output terminal of the operation amplifier 422 serves as the output terminal of the current to voltage converting unit 420. To meet different characteristics of different touch panels, the resistors 421, R1 and/or R2 can be implemented by variable resistors according to a design requirement of the user.

Figure 7:
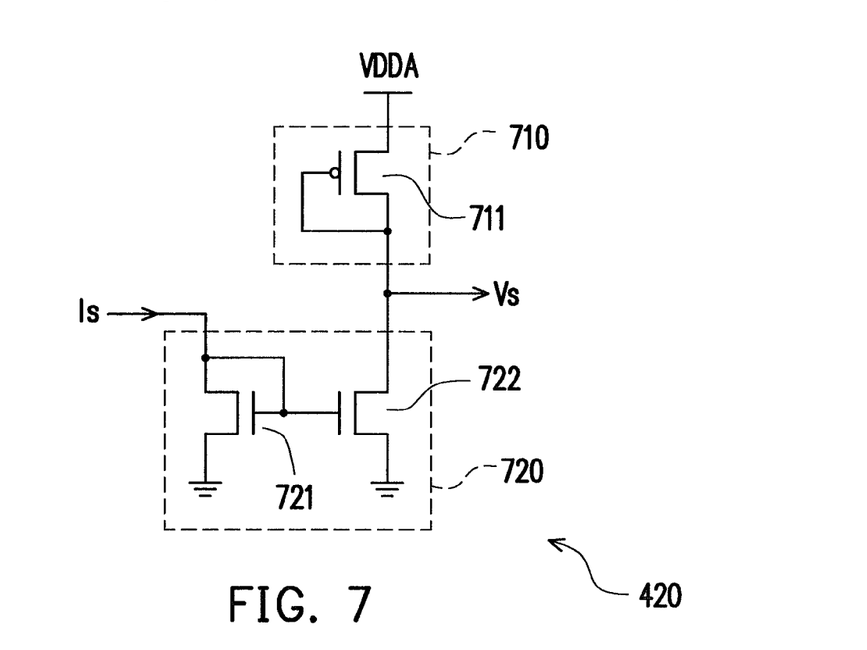
FIG. 7 is another circuit diagram of a current to voltage converting unit of FIG. 4 according to an embodiment of the present invention.

FIG. 7 is another circuit diagram of the current to voltage converting unit 420 of FIG. 4 according to an embodiment of the present invention. The current to voltage converting unit 420 includes a resistor 710 and a current mirror 720. A first terminal of the resistor 710 receives a third reference voltage (for example, the system voltage VDDA), and a second terminal of the resistor 710 is coupled to the resistor R1. Here, the resistor 710 is implemented by a P-channel metal oxide semiconductor (PMOS) transistor 711 for reducing a chip area occupied by the resistor 710. A first terminal (for example, a source) of the transistor 711 receives the system voltage VDDA, and a second terminal (for example, a drain) and a control terminal (for example, a gate) of the transistor 711 are coupled to the resistor R1.

A master current terminal of the current mirror 720 receives the sensing current Is, and a slave current terminal of the current mirror 720 is coupled to the second terminal of the resistor 710. By setting a current ratio between the master current terminal and the slave current terminal of the current mirror 720, the current mirror 720 can amplify the weak sensing current Is. The amplified sensing current Is can be converted into the sensing voltage Vs through the resistor 710. By such means, in case that a photo transistor PT is irradiated by a strong light and a weak light, a variation range of the obtained sensing voltage Vs is increased, so that a recognition degree of the sensing voltage Vs can be increased. The sensing voltage Vs is again amplified by the inverting amplifier 610 to facilitate a follow-up processing.

The current mirror 720 includes a first transistor 721 and a second transistor 722. In the present embodiment, the transistors 721 and 722 are implemented by N-channel metal oxide semiconductor (NMOS) transistors. A first terminal (for example, a drain) of the transistor 721 serves as the master current terminal of the current mirror 720, a second terminal (for example, a source) of the transistor 721 receives a fourth reference voltage (for example, the ground voltage), and a control terminal (for example, a gate) of the transistor 721 is coupled to the first terminal of the transistor 721. A first terminal of the transistor 722 serves as the slave current terminal of the current mirror 720, a second terminal of the transistor 722 receives the fourth reference voltage (the ground voltage), and a control terminal of the transistor 722 is coupled to the control terminal of the transistor 721. The current ratio between the master current terminal and the slave current terminal of the current mirror 720 can be set by determining an aspect ratio of the transistors 721 and 722.

Figure 8:
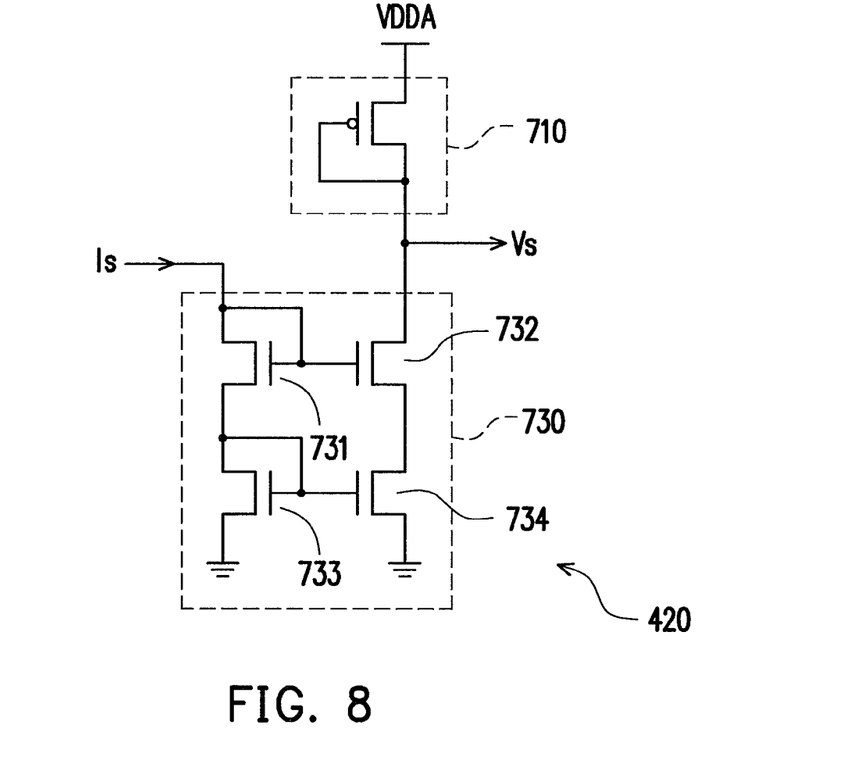
FIG. 8 is still another circuit diagram of a current to voltage converting unit of FIG. 4 according to an embodiment of the present invention.

FIG. 8 is still another circuit diagram of the current to voltage converting unit 420 of FIG. 4 according to an embodiment of the present invention. The present embodiment is similar to the embodiment of FIG. 7, so that a part of the descriptions are not repeated. A current mirror 730 is used to replace the aforementioned current mirror 720. The current mirror 730 includes a first transistor 731, a second transistor 732, a third transistor 733 and a fourth transistor 734. A first terminal (for example, a drain) of the transistor 731 serves as a master current terminal of the current mirror 730, and a control terminal (for example, a gate) of the transistor 731 is coupled to the first terminal of the transistor 731. A first terminal (for example, a drain) of the transistor 732 serves as a slave current terminal of the current mirror 730, and a control terminal (for example, a gate) of the transistor 732 is coupled to the control terminal of the transistor 731. A first terminal (for example, a drain) of the transistor 733 is coupled to a second terminal (for example, a source) of the transistor 731, a second terminal (for example, a source) of the transistor 733 receives the reference voltage (for example, the ground voltage), and a control terminal (for example, a gate) of the transistor 733 is coupled to the first terminal of the transistor 733. A first terminal (for example, a drain) of the transistor 734 is coupled to a second terminal (for example, a source) of the transistor 732, a second terminal (for example, a source) of the transistor 734 receives the reference voltage (for example, the ground voltage), and a control terminal (for example, a gate) of the transistor 734 is coupled to the control terminal of the transistor 733.

Figure 9:
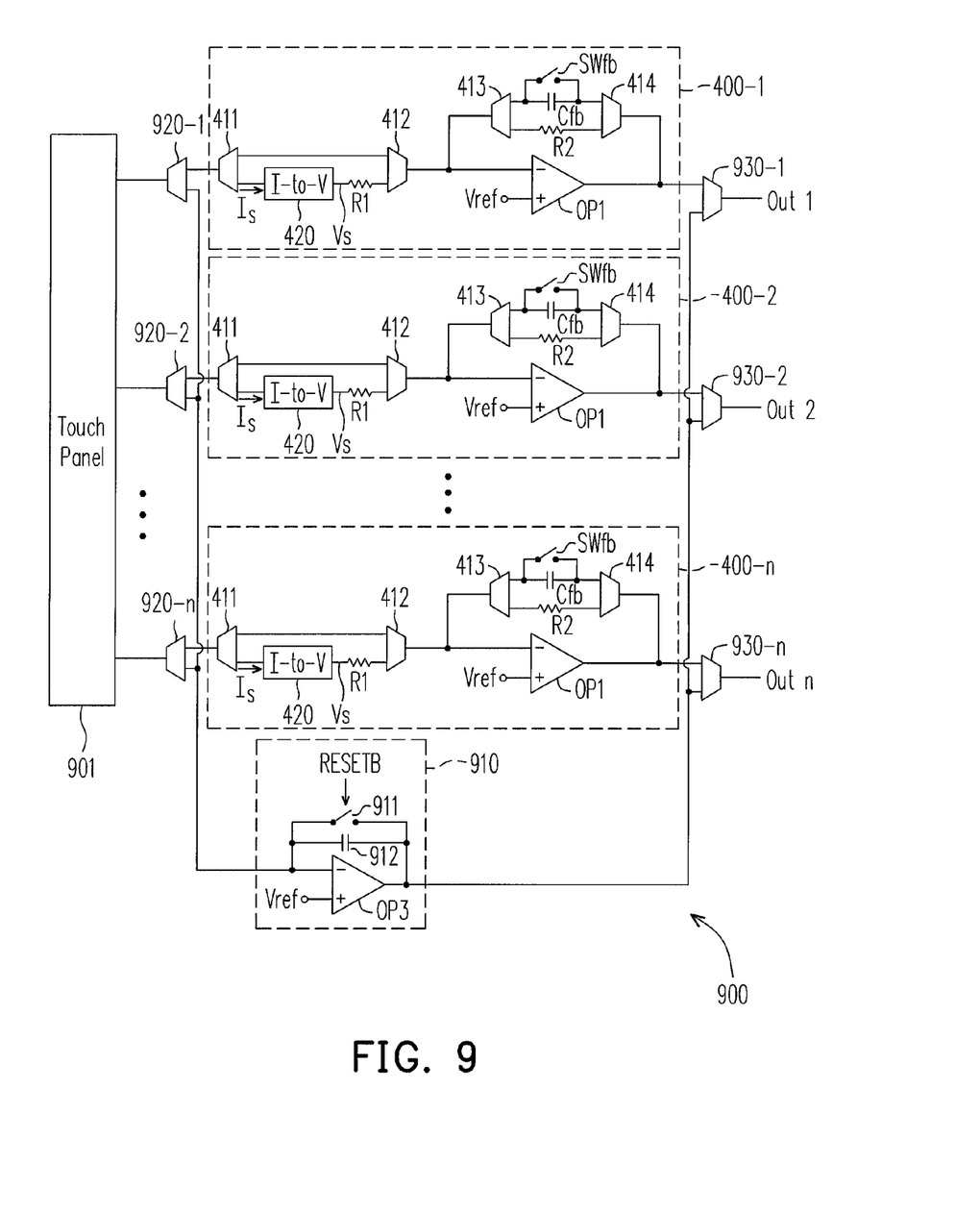
FIG. 9 is a circuit diagram of a multi-channel readout apparatus of a touch panel according to another embodiment of the present invention.

FIG. 9 is a circuit diagram of a multi-channel readout apparatus 900 of a touch panel according to another embodiment of the present invention. The readout apparatus 900 has a plurality of channels, an input terminal of each channel is coupled to the corresponding sensor line of the touch panel 901, and an output terminal of each channel transmits a readout result to a follow-up circuit (including the ADC and the image processing circuit, which are not illustrated) for determining the coordinates of the touch position. The touch panel 901 can be the photo charge type touch panel 110, the photo current type touch panel 210, the capacitive touch panel 310 or other types of the touch panel.

The multi-channel readout apparatus 900 includes an integrator 910 and a plurality of the channels, wherein each of the channels includes an input selector, a single-channel readout apparatus (for example, the readout apparatus 400 of FIG. 4) and an output selector. For example, a first channel includes an input selector 920-1, a single-channel readout apparatus 400-1 and an output selector 930-1. A second channel includes an input selector 920-2, a single-channel readout apparatus 400-2 and an output selector 930-2. Deduced by analogy, an $n^{th}$ channel includes an input selector 920-$n$, a single-channel readout apparatus 400-$n$ and an output selector 930-$n$. A common terminal of each of the selectors 920-1~920-$n$ and 930-1~930-$n$ is electrically connected to a first selection terminal or a second selection terminal, selectively. For example, the input selector 920-1 can electrically connect the common terminal thereof to the first selection terminal thereof, or can electrically connect the common terminal to the second selection terminal thereof. In the present embodiment, the input selectors 920-1~920-$n$ are demultiplexers, and the output selectors 930-1~930-$n$ are multiplexers.

The integrator 910 includes an operation amplifier OP3, a feedback capacitor 912 and a feedback switch 911. An input first terminal of the operation amplifier OP3 is coupled to the first selection terminals of the input selectors 920-1~920-$n$ of all of the channels. A first terminal and a second terminal of the feedback capacitor 912 are respectively coupled to an inverting input terminal and an output terminal of the operation amplifier OP3. A first terminal and a second terminal of the feedback switch 911 are also respectively coupled to the inverting input terminal and the output terminal of the operation amplifier OP3. A non-inverting input terminal of the operation amplifier OP3 receives the reference voltage Vref. Here, a capacitance (or an area) of the feedback capacitor 912 is much bigger than a capacitance (or an area) of the feedback capacitor Cfb in each of the channels.

In the present embodiment, an implementing method of each of the single-channel readout apparatus 400-1~400-$n$ is similar to that of the readout apparatus 400 of FIG. 4, and therefore detail descriptions thereof are not repeated. Moreover, the first channel is described in detail below, and descriptions of the other channels can be deduced by analogy according to the descriptions of the first channel.

In the first channel, the common terminal of the input selector 920-1 is coupled to the corresponding sensor line (for example, a first sensor line) of the touch panel 901. The first selection terminal of the input selector 920-1 is coupled to the input terminal of the integrator 910, and the second selection terminal of the input selector 920-1 is coupled to the common terminal of the selector 411 in the single-channel readout apparatus 400-1. The first selection terminal of the output selector 930-1 is coupled to the output terminal of the integrator 910, and the second selection terminal of the output selector 930-1 is coupled to the output terminal of the first operation amplifier OP1 in the single-channel readout apparatus 400-1.

The touch panel 901 corresponding to the first mode can be the photo charge type touch panel 110 of FIG. 1. In the first mode, the input selectors 920-1~920-$n$, the selectors 411-414 and the output selectors 930-1~930-$n$ of all of the channels respectively select to electrically connect the common terminal thereof to the second selection terminal thereof. In the first mode, when the feedback switch SWfb is turned off, the operation amplifier OP1 and the feedback capacitor Cfb form an integrator. Each of the channels of the multi-channel readout apparatus 900 set to the first mode can be equivalent to the integrator shown in FIG. 5 (i.e. the readout apparatus 400 in FIG. 5). Therefore, the multi-channel readout apparatus 900 set to the first mode can read the sensing signals from the photo charge type touch panel 110, and transmit the readout result to the follow-up circuit (not illustrated) through the output selectors 930-1~930-$n$ for determining the coordinates of the touch position.

Referring to FIG. 9, the touch panel 901 corresponding to the second mode can be the photo current type touch panel 210 of FIG. 2. In the second mode, the input selectors 920-1~920-$n$, and the output selectors 930-1~930-$n$ of all of the channels respectively select to electrically connect the common terminal thereof to the second selection terminal thereof, and the selectors 411-414 respectively select to electrically connect the common terminal thereof to the first selection terminal thereof. In the second mode, each of the channels of the multi-channel readout apparatus 900 can be regarded as a readout circuit formed by the current to voltage converting unit 420 and the inverting amplifier 610, as that shown in FIG. 6. Therefore, the current to voltage converting unit 420 can convert the sensing current Is of the current type touch panel 210 into the sensing voltage Vs. After the inverting amplifier 610 formed by the resistor R1, the resistor R2 and the operation amplifier OP1 gains the sensing voltage Vs, the readout result is transmitted to the follow-up circuit (not illustrated) through the output selectors 930-1~930-$n$ for determining the coordinates of the touch position.

Referring to FIG. 9, the touch panel 901 corresponding to the third mode can be the capacitive touch panel 310 of FIG. 3. In the third mode, the selectors 411-414 of each of the channels respectively select to electrically connect the common terminal thereof to the second selection terminal thereof, and the feedback switch SWfb of each of the channels is turned on. Therefore, the readout apparatus 400-1~400-$n$ of the channels can respectively form a unit-gain amplifier, as that shown in FIG. 10.

Figure 10:
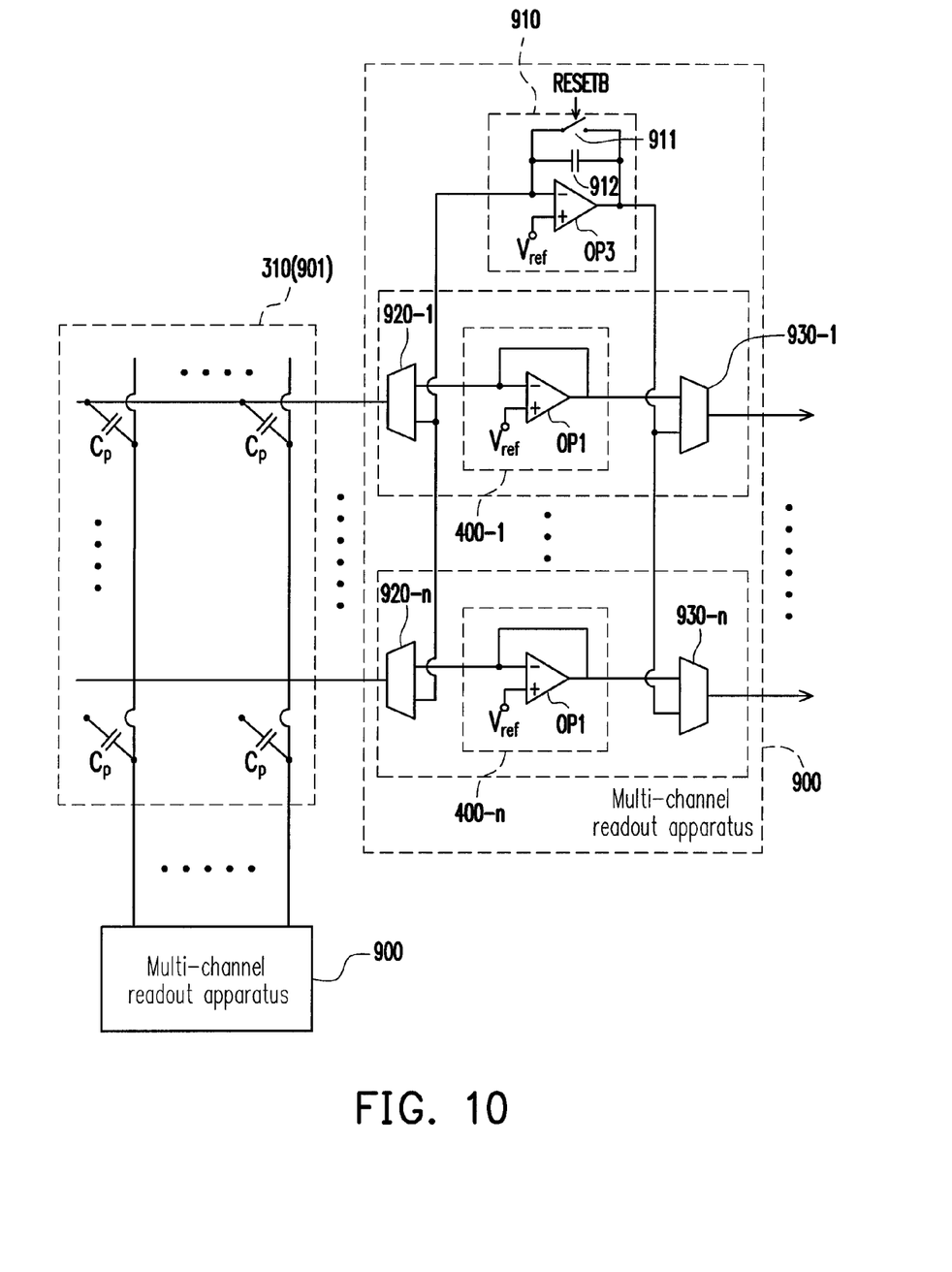
FIG. 10 is an equivalent circuit diagram of a readout apparatus of FIG. 9 that is set to a third mode according to an embodiment of the present invention.

FIG. 10 is an equivalent circuit diagram of the readout apparatus 900 of FIG. 9 that is set to the third mode according to an embodiment of the present invention. The touch panel 901 is assumed to be the capacitive touch panel 310 of FIG. 3. Referring to FIG. 10, during a period when the system is initially powered on, or during a reset period of the system, the system sets the reset signal RESET to an enabling state (which may have the logic low level), and the input selectors 920-1~920-$n$ and the output selectors 930-1~930-$n$ of all of the channels respectively select to electrically connect the common terminal thereof to the second selection terminal thereof. When the reset signal RESET has the logic low level (i.e. the signal RESETB is set to the logic-high level), the feedback switch 911 is turned on to reset the feedback capacitor 912.

Referring to FIG. 10 and FIG. 11, during a first channel period T1, the system sets the reset signal RESET to the logic high level (i.e. the signal RESETB is set to the logic-low level), the input selector 920-1 and the output selector 930-1 of the first channel respectively select to electrically connect the common terminal thereof to the first selection terminal thereof, and the input selectors (for example, the input selector 920-n) and the output selectors (for example, the output selector 930-n) of the other channels respectively select to electrically connect the common terminal thereof to the second selection terminal thereof. Therefore, during the first channel period T1, the first channel can use the integrator 910. When the reset signal RESET has the logic high level to turn off the switch 911, the integrator 910 can perform the integration operation to the sensor line of the touch panel 310 (i.e. the touch panel 901), and then the operation amplifier OP3 transmits the readout result to the follow-up circuit (not illustrated) through the output selector 930-1 for determining the coordinates of the touch position. During the first channel period T1, besides the first channel, the other channels can couple the input terminals of the internal unit-gain amplifiers (i.e. the readout apparatus 400-2~400-n) to the corresponding sensor lines of the touch panel 310.

During the period that a current channel period (e.g. the first channel period T1 finishes and a next channel period (e.g. a second channel period T2) does not yet start (equivalent to the reset period), the system set the reset signal RESET to the logic low level as shown in FIG. 11, so that the feedback switch 911 is turned on to reset the feedback capacitor 912. During this period, the input selectors 920-1~920-n and the output selectors 930-1~930-n of all of the channels respectively select to electrically connect the common terminal thereof to the second selection terminal thereof, so that the unit-gain amplifiers (i.e. the readout apparatus 400-1~400-n) are coupled to the sensor lines of the touch panel 110.

Thereafter, the second channel period T2 is entered. During the second channel period T2, the second channel (which is not illustrated in FIG. 10, though the second channel can be deduced according to the related descriptions of the first channel) can use the integrator 910, and the other channels can couple the input terminals of the internal unit-gain amplifiers to the corresponding sensor lines of the touch panel 310 for replacing the input terminal of the integrator. Deduced by analogy, during an $n^{th}$ channel period Tn, the $n^{th}$ channel can use the integrator 910, and the other channels can couple the input terminals of the internal unit-gain amplifiers to the corresponding sensor lines of the touch panel 110. Detail operations of the readout apparatus during the second channel period T2, . . . , the $n^{th}$ channel period Tn are the same to that of the readout apparatus during the first channel period T1, and therefore detail operations thereof are not repeated.

In summary, according to the aforementioned embodiment, different types of the readout circuit are integrated. When the multi-channel readout apparatus 900 is set to the second mode, the multi-channel readout apparatus 900 uses the current to voltage converting unit 420 and the inverting amplifier to read the sensing current of the current type touch panel, so as to avoid using the integral capacitor and reduce the chip area occupied by the feedback capacitors. In the third mode, the multiple channels of the multi-channel readout apparatus 900 can alternately share a common integrator to read the sensing charges of the capacitive touch panel, so that an area of the feedback capacitor (integral capacitor) can be greatly reduced. Therefore, the multi-channel readout apparatus 900 of the present invention can not only reduce a chip area, but can also be applied to various types of the touch panel.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A readout apparatus for a touch panel, comprising:
a first selector, having a common terminal electrically connected to a first selection terminal or a second selection terminal, selectively;
a current to voltage converting unit, having an input terminal coupled to the first selection terminal of the first selector;
a first resistor, having a first terminal coupled to an output terminal of the current to voltage converting unit;
a second selector, having a common terminal electrically connected to a first selection terminal or a second selection terminal, selectively, wherein the first selection terminal of the second selector is coupled to a second terminal of the first resistor, and the second selection terminal of the second selector is coupled to the second selection terminal of the first selector;
a first operation amplifier, having a first input terminal coupled to the common terminal of the second selector, and a second input terminal receiving a first reference voltage;
a third selector, having a common terminal electrically connected to a first selection terminal or a second selection terminal, selectively, wherein the common terminal of the third selector is coupled to the first input terminal of the first operation amplifier;
a fourth selector, having a common terminal electrically connected to a first selection terminal or a second selection terminal, selectively, wherein the common terminal of the fourth selector is coupled to an output terminal of the first operation amplifier;
a second resistor, having a first terminal coupled to the first selection terminal of the third selector, and a second terminal coupled to the first selection terminal of the fourth selector;
a feedback capacitor, having a first terminal coupled to the second selection terminal of the third selector, and a second terminal coupled to the second selection terminal of the fourth selector; and
a feedback switch, having a first terminal and a second terminal respectively coupled to the first terminal and the second terminal of the feedback capacitor.

2. The readout apparatus for the touch panel as claimed in claim 1, wherein the current to voltage converting unit comprises:
a third resistor, having a first terminal serving as the input terminal of the current to voltage converting unit, and a second terminal coupled to a second reference voltage; and
a unit-gain amplifier, having an input terminal coupled to the first terminal of the third resistor, and an output terminal serving as the output terminal of the current to voltage converting unit.

3. The readout apparatus for the touch panel as claimed in claim 2, wherein the unit-gain amplifier comprises a second operation amplifier, a first terminal of the second operation amplifier serves as the input terminal of the unit-gain amplifier, a second terminal of the second operation amplifier is coupled to an output terminal of the second operation amplifier, and the output terminal of the second operation amplifier serves as the output terminal of the unit-gain amplifier.

4. The readout apparatus for the touch panel as claimed in claim 1, wherein the current to voltage converting unit comprises:
a third resistor, having a first terminal receiving a third reference voltage, and a second terminal serving as the output terminal of the current to voltage converting unit; and
a current mirror, having a master current terminal serving as the input terminal of the current to voltage converting unit, and a slave current terminal coupled to the second terminal of the third resistor.

5. The readout apparatus for the touch panel as claimed in claim 4, wherein the third resistor is a transistor, a first terminal of the transistor receives the third reference voltage, and a second terminal and a control terminal of the transistor are coupled to the slave current terminal of the current mirror.

6. The readout apparatus for the touch panel as claimed in claim 4, wherein the current mirror comprises:
a first transistor, having a first terminal serving as the master current terminal of the current mirror, a second terminal receiving a fourth reference voltage, and a control terminal coupled to the first terminal of the first transistor; and
a second transistor, having a first terminal serving as the slave current terminal of the current mirror, a second terminal receiving the fourth reference voltage, and a control terminal coupled to the control terminal of the first transistor.

7. The readout apparatus for the touch panel as claimed in claim 6, wherein the third reference voltage is a system voltage, and the fourth reference voltage is a ground voltage.

8. The readout apparatus for the touch panel as claimed in claim 4, wherein the current mirror comprises:
a first transistor, having a first terminal serving as the master current terminal of the current mirror, and a control terminal coupled to the first terminal of the first transistor;
a second transistor, having a first terminal serving as the slave current terminal of the current mirror, and a control terminal coupled to the control terminal of the first transistor;
a third transistor, having a first terminal coupled to a second terminal of the first transistor, a second terminal receiving a fourth reference voltage, and a control terminal coupled to the first terminal of the third transistor; and
a fourth transistor, having a first terminal coupled to a second terminal of the second transistor, a second terminal receiving the fourth reference voltage, and a control terminal coupled to the control terminal of the third transistor.

9. The readout apparatus for the touch panel as claimed in claim 1, wherein in a first mode, the first, the second, the third and the fourth selectors respectively select to electrically connect the common terminal thereof to the second selection terminal thereof.

10. The readout apparatus for the touch panel as claimed in claim 1, wherein in a second mode, the first, the second, the third and the fourth selectors respectively select to electrically connect the common terminal thereof to the first selection terminal thereof.

11. The readout apparatus for the touch panel as claimed in claim 1, wherein the common terminal of the first resistor is coupled to a corresponding sensor line of the touch panel.

12. A multi-channel readout apparatus for a touch panel, comprising:
an integrator; and
a plurality of channels, and each of the channels comprising:
an input selector, having a common terminal electrically connected to a first selection terminal or a second selection terminal, selectively, wherein the first selection terminal of the input selector is coupled to an input terminal of the integrator;
a first selector, having a common terminal electrically connected to a first selection terminal or a second selection terminal, selectively, wherein the common terminal of the first selector is coupled to the second selection terminal of the input selector;
a current to voltage converting unit, having an input terminal coupled to the first selection terminal of the first selector;
a first resistor, having a first terminal coupled to an output terminal of the current to voltage converting unit;
a second selector, having a common terminal electrically connected to a first selection terminal or a second selection terminal, selectively, wherein the first selection terminal of the second selector is coupled to a second terminal of the first resistor, and the second selection terminal of the second selector is coupled to the second selection terminal of the first selector;
a first operation amplifier, having a first input terminal coupled to the common terminal of the second selector, and a second input terminal receiving a first reference voltage;
a third selector, having a common terminal electrically connected to a first selection terminal or a second selection terminal, selectively, wherein the common terminal of the third selector is coupled to the first input terminal of the first operation amplifier;
a fourth selector, having a common terminal electrically connected to a first selection terminal or a second selection terminal, selectively, wherein the common terminal of the fourth selector is coupled to an output terminal of the first operation amplifier;
a second resistor, having a first terminal coupled to the first selection terminal of the third selector, and a second terminal coupled to the first selection terminal of the fourth selector;
a feedback capacitor, having a first terminal coupled to the second selection terminal of the third selector, and a second terminal coupled to the second selection terminal of the fourth selector;
a feedback switch, having a first terminal and a second terminal respectively coupled to the first terminal and the second terminal of the feedback capacitor; and
an output selector, having a common terminal electrically connected to a first selection terminal or a second selection terminal, selectively, wherein the first selection terminal of the output selector is coupled to an output terminal of the integrator, and the second selection terminal of the output selector is coupled to the output terminal of the first operation amplifier.

13. The multi-channel readout apparatus for the touch panel as claimed in claim 12, wherein the current to voltage converting unit comprises:
a third resistor, having a first terminal serving as the input terminal of the current to voltage converting unit, and a second terminal coupled to a second reference voltage; and a unit-gain amplifier, having an input terminal coupled to the first terminal of the third resistor, and an output terminal serving as the output terminal of the current to voltage converting unit.

14. The multi-channel readout apparatus for the touch panel as claimed in claim 13, wherein the unit-gain amplifier comprises a second operation amplifier, a first terminal of the second operation amplifier serves as the input terminal of the unit-gain amplifier, a second terminal of the second operation amplifier is coupled to an output terminal of the second operation amplifier, and the output terminal of the second operation amplifier serves as the output terminal of the unit-gain amplifier.

15. The multi-channel readout apparatus for the touch panel as claimed in claim 12, wherein the current to voltage converting unit comprises:
a third resistor, having a first terminal receiving a third reference voltage, and a second terminal serving as the output terminal of the current to voltage converting unit; and
a current mirror, having a master current terminal serving as the input terminal of the current to voltage converting unit, and a slave current terminal coupled to the second terminal of the third resistor.

16. The multi-channel readout apparatus for the touch panel as claimed in claim 15, wherein the third resistor is a transistor, a first terminal of the transistor receives the third reference voltage, and a second terminal and a control terminal of the transistor are coupled to the slave current terminal of the current mirror.

17. The multi-channel readout apparatus for the touch panel as claimed in claim 15, wherein the current mirror comprises:
a first transistor, having a first terminal serving as the master current terminal of the current mirror, a second terminal receiving a fourth reference voltage, and a control terminal coupled to the first terminal of the first transistor; and
a second transistor, having a first terminal serving as the slave current terminal of the current mirror, a second terminal receiving the fourth reference voltage, and a control terminal coupled to the control terminal of the first transistor.

18. The multi-channel readout apparatus for the touch panel as claimed in claim 17, wherein the third reference voltage is a system voltage, and the fourth reference voltage is a ground voltage.

19. The multi-channel readout apparatus for the touch panel as claimed in claim 15, wherein the current mirror comprises:
a first transistor, having a first terminal serving as the master current terminal of the current mirror, and a control terminal coupled to the first terminal of the first transistor;
a second transistor, having a first terminal serving as the slave current terminal of the current mirror, and a control terminal coupled to the control terminal of the first transistor;
a third transistor, having a first terminal coupled to a second terminal of the first transistor, a second terminal receiving a fourth reference voltage, and a control terminal coupled to the first terminal of the third transistor; and
a fourth transistor, having a first terminal coupled to a second terminal of the second transistor, a second terminal receiving the fourth reference voltage, and a control terminal coupled to the control terminal of the third transistor.

20. The multi-channel readout apparatus for the touch panel as claimed in claim 12, wherein in a first mode, the input selector, the first, the second, the third and the fourth selectors and the output selector respectively select to electrically connect the common terminal thereof to the second selection terminal thereof.

21. The multi-channel readout apparatus for the touch panel as claimed in claim 12, wherein in a second mode, the input selector and the output selector respectively select to electrically connect the common terminal thereof to the second selection terminal thereof, and the first, the second, the third and the fourth selectors respectively select to electrically connect the common terminal thereof to the first selection terminal thereof.

22. The multi-channel readout apparatus for the touch panel as claimed in claim 12, wherein in a third mode, the first, the second, the third and the fourth selectors respectively select to electrically connect the common terminal thereof to the second selection terminal thereof, and the feedback switch is turned on.

23. The multi-channel readout apparatus for the touch panel as claimed in claim 22, wherein during a channel period of a plurality of channel periods in the third mode, the input selector and the output selector of one of the channels respectively select to electrically connect the common terminal thereof to the first selection terminal thereof, and the input selectors and the output selectors of the other channels respectively select to electrically connect the common terminal thereof to the second selection terminal thereof.

24. The multi-channel readout apparatus for the touch panel as claimed in claim 22, wherein during the period that a current channel period finishes and a next channel period does not yet start, the input selectors and the output selectors of the channels respectively select to electrically connect the common terminal thereof to the first selection terminal thereof.

25. The multi-channel readout apparatus for the touch panel as claimed in claim 12, wherein the common terminals of the input selectors of the channels are coupled to corresponding sensor lines of the touch panel respectively.

* * * * *